UNITED STATES PATENT OFFICE.

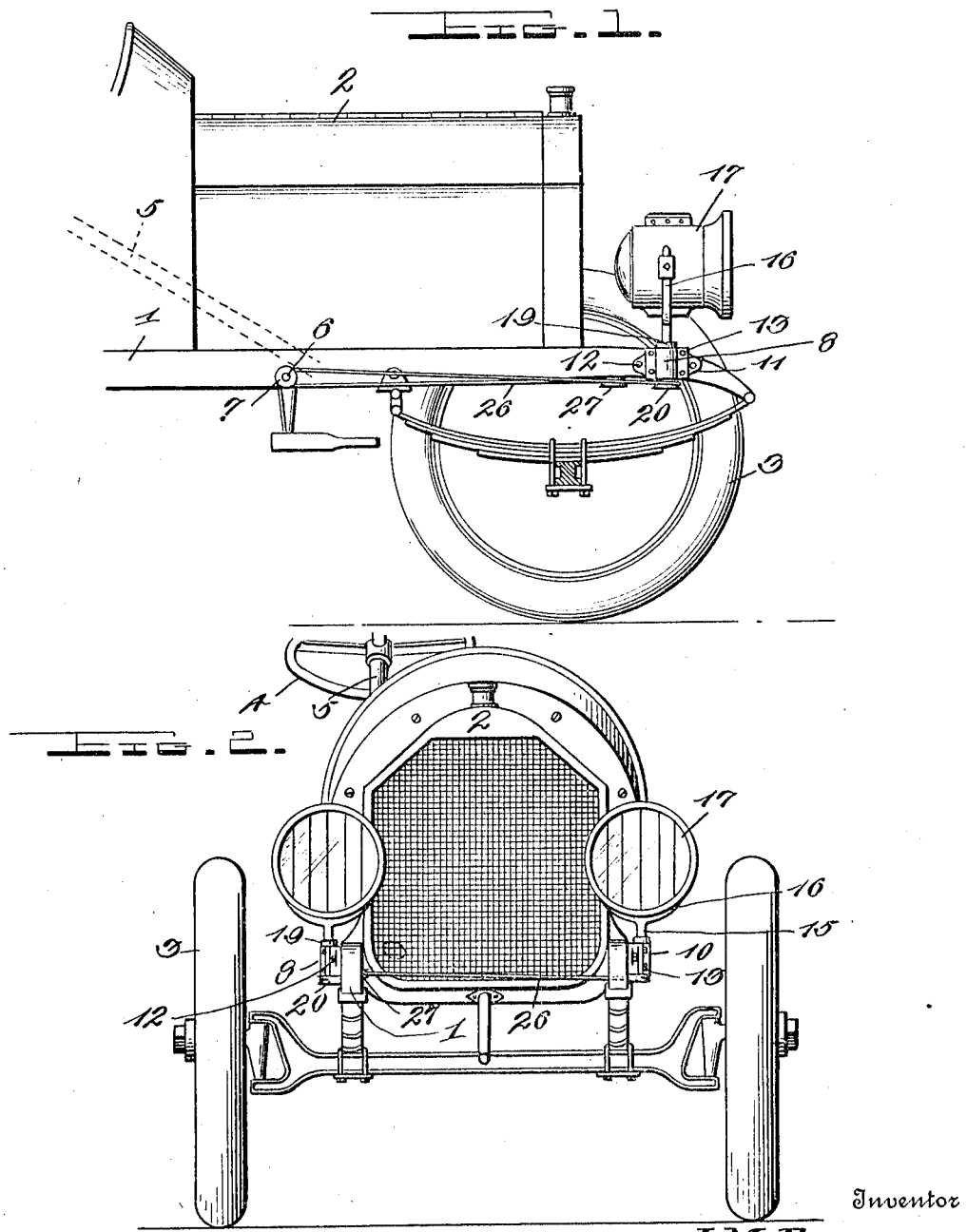

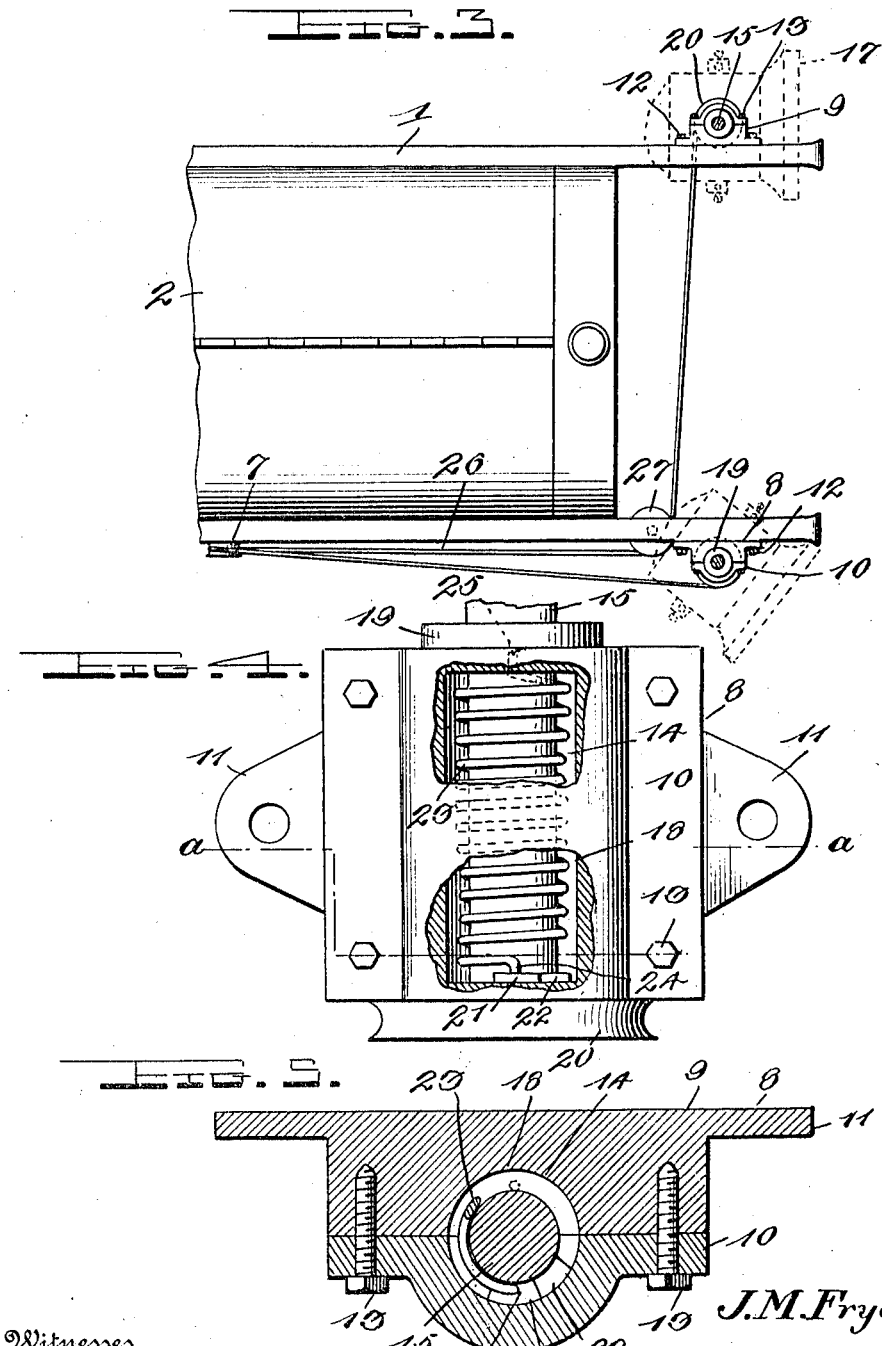

JAMES MADISON FRYER, OF MIDDLETOWN, OHIO.

HEADLIGHT-OPERATING MECHANISM.

1,035,569.   Specification of Letters Patent.   Patented Aug. 13, 1912.

Application filed November 25, 1911. Serial No. 662,299.

*To all whom it may concern:*

Be it known that I, JAMES MADISON FRYER, a citizen of the United States, residing at Middletown, in the county of Butler and State of Ohio, have invented certain new and useful Improvements in Headlight-Operating Mechanisms, of which the following is a specification, reference being had to the accompanying drawings.

This invention is an improved head light operating mechanism for use especially on automobiles, to automatically turn one of the head lights in the direction to be taken by the automobile and leave the other head light arranged to throw its rays straight ahead, the invention consisting in the construction, combination and arrangement of devices hereinafter described and claimed.

In the accompanying drawings: Figure 1 is a side elevation of a portion of an automobile provided with head lights and automatically operating means therefor in accordance with my invention, the parts of the automobile being indicated in outline; Fig. 2 is a front elevation of the same; Fig. 3 is a plan of the same; Fig. 4 is a detail elevation, partly in section, showing the bearing and the fork shaft of one of the head lights; and Fig. 5 is a horizontal sectional view of the same on the plane indicated by the line $a$—$a$ of Fig. 4.

For the purposes of this specification a portion of the frame of an automobile is indicated at 1, the hood at 2, the front wheels at 3, the steering wheel at 4, the steering wheel shaft at 5, and the guiding shaft, which is geared to the steering wheel shaft, at 6. In accordance with my invention I secure a pulley 7 on the shaft 6.

On opposite sides of the frame, at the front end of the car, are bearings 8, each of which comprises a main member or base portion 9 and a removable member 10. The main member is provided at its ends with lugs 11, through which extend bolts 12 that secure the same to the car frame. Each member 10 is secured to one of the members 9 detachably, by means of bolts 13. The members 9, 10 are provided in their opposing sides with cylindrical bearing openings 14 for the reception of the shafts or standards 15 of the forks 16 which carry the head lights or lamps 17. The bearing members 9, 10 are also chambered, between their upper and lower sides, as at 18, the diameter of the chambers 18 exceeding that of the shafts 15. Each of the said shafts is provided with a collar 19 which forms an annular flange and bears on the upper side of the bearing and is also provided, at its lower end, with a pulley 20 which bears against the lower side of the bearing, said collars and pulleys coacting to hold the shaft in place against vertical movement, but permitting the shaft to partly turn in the bearing, as herein described. Each shaft is also provided with a radial shoulder 21 on one side to coact with a similar shoulder 22 to form a stop for the shaft, and in each chamber 18 is a spring 23, here shown as a coil spring, disposed around the shaft and having one end secured thereto, as at 24, and the other end secured to the bearing, as at 25. These springs serve to turn the shafts so as to normally keep the stop shoulders of the shafts and bearings in engagement and thereby hold the shafts normally in the required position to keep the head lights 17 parallel with the body of the car and hence cause the rays of the head lights to be thrown straight ahead.

An operating cord 26 is partly wound on the pulley or drum 7 and its ends are reversely connected to and partly wound on the pulleys 20 of the head light standard shafts. One lead of the operating cord also engages a direction pulley 27 under the frame of the car.

When the shaft is turned in the direction required to turn the car to the right the pulley 7 will cause the cord 26 to turn the shaft 15 of the right-hand head light or lamp to the right, and the lead of the cord, which extends to the shaft of the left-hand head light, will slacken. Hence the left-hand head light will continue in its normal position, held by the spring 18 and the shoulders 21, 22 parallel with the car so as to throw its rays straight ahead. When the car turns to the left, the action is reversed, the right-hand head light remaining straight and the left-hand head light turning with the car, as will be understood.

Having thus described my invention I claim:

In combination with the vertically arranged supporting shaft of a head light, a bearing for said shaft comprising a main member and a removable member detachably secured thereto, the said members being provided in their opposing sides with a vertical cylindrical chamber of greater diameter than the shaft and through which the latter extends, the said shaft and the main member being provided with coacting stop shoulders, located in the said chamber, to limit the turning of the shaft in one direction, a spring arranged on the shaft, located in the said chamber, connected at one end to the bearing and at the other end to the shaft and exerting its tension on the shaft to normally keep the stop shoulder of the latter in engagement with that of the bearing, and means connected to the steering gear of an automobile to automatically turn the said shaft in one direction, against the tension of its spring, when the steering gear is actuated.

In testimony whereof I hereunto affix my signature in the presence of two witnesses.

JAMES MADISON FRYER.

Witnesses:
 MILDRED TODHUNTER,
 IRVINA DEARTH.

Copies of this patent may be obtained for five cents each, by addressing the "Commissioner of Patents, Washington, D. C."